US008670889B2

(12) United States Patent
Kaznov

(10) Patent No.: US 8,670,889 B2
(45) Date of Patent: Mar. 11, 2014

(54) UNITARY ROLLING VEHICLE

(75) Inventor: Viktor Kaznov, Johanneshov (SE)

(73) Assignee: Rotundus AB, Stockholm (SE)

( * ) Notice: Subject to any disclaimer, the term of this patent is extended or adjusted under 35 U.S.C. 154(b) by 445 days.

(21) Appl. No.: 12/991,735

(22) PCT Filed: May 7, 2009

(86) PCT No.: PCT/SE2009/050497
§ 371 (c)(1),
(2), (4) Date: Nov. 9, 2010

(87) PCT Pub. No.: WO2009/136857
PCT Pub. Date: Nov. 12, 2009

(65) Prior Publication Data
US 2011/0060492 A1    Mar. 10, 2011

(30) Foreign Application Priority Data
May 9, 2008    (SE) ...................................... 0801053

(51) Int. Cl.
*G01C 22/00*    (2006.01)
(52) U.S. Cl.
USPC ......................................................... 701/23
(58) Field of Classification Search
USPC ............................ 701/23, 27, 59; 700/47, 245
See application file for complete search history.

(56) References Cited

U.S. PATENT DOCUMENTS

| 5,791,425 A | 8/1998 | Kamen et al. | |
| 6,227,933 B1 * | 5/2001 | Michaud et al. | 446/462 |
| 6,289,263 B1 | 9/2001 | Mukherjee | |
| 6,302,230 B1 | 10/2001 | Kamen et al. | |
| 6,378,634 B1 | 4/2002 | Yim | |
| 6,702,050 B1 | 3/2004 | Mazhar | |
| 2007/0215394 A1 | 9/2007 | Sun et al. | |

FOREIGN PATENT DOCUMENTS

| EP | 1 563 716 B1 | 2/2008 | |
| WO | 2006/049559 A1 | 5/2006 | |
| WO | WO 2006/049559 | * 5/2006 | ............... B25J 11/00 |

OTHER PUBLICATIONS

International Search Report, dated Oct. 26, 2009, from corresponding PCT application.
Aarne Halme et al., "Motion Control of a Spherical Mobile Robot", Advanced Motion Control, Mar. 18, 1996, pp. 259-264, vol. 1.
J. Alves et al., "Design and control of a spherical mobile robot", Proceedings of the Institution of Mechanical Engineers, Part I (Journal of Systems and Control Engineering), 2003, pp. 457-467, vol. 217, No. I6.

* cited by examiner

*Primary Examiner* — Kim T Nguyen
(74) *Attorney, Agent, or Firm* — Young & Thompson

(57) ABSTRACT

Unitary rolling vehicle including a rolling member (20), a drive system (30) supported by the rolling member and arranged to drive the rolling member for rotation, the centre of mass of the drive system being lower compared to the centre of the rolling member in the vertical direction at rest, and a control system for controlling the drive system, wherein the control system includes dynamic state sensors arranged to detect the instant dynamic state of the vehicle and the drive system.

12 Claims, 9 Drawing Sheets

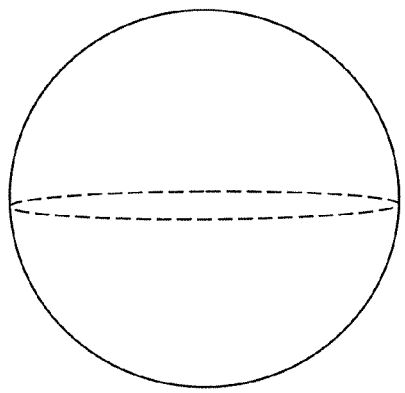 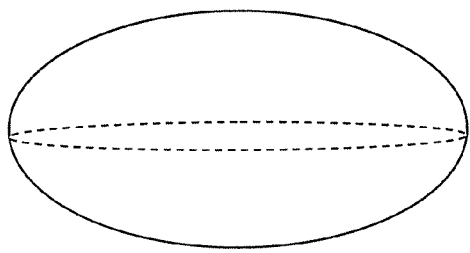
Fig. 1a				Fig. 1b
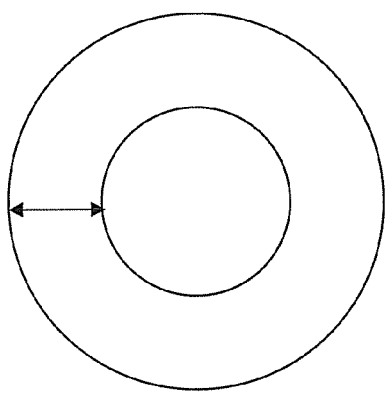 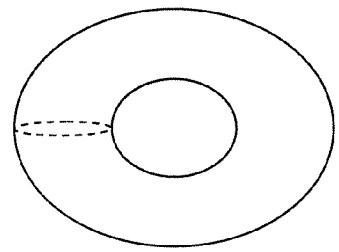
Fig. 1c				Fig. 1d

UNITARY ROLLING VEHICLE

BACKGROUND OF THE INVENTION

The present invention relates to an autonomous or controlled unitary rolling vehicle capable of moving in various environments, including indoors, outdoors as well as the planetary bodies such as planets and the Moon.

A unitary rolling vehicle is defined as a vehicle with a rolling member arranged for rolling movement, comprising a drive system supported by the rolling member and arranged to drive the rolling member for rotation, wherein the centre of mass of the drive system is lower compared to the centre of the rolling member in the vertical direction at rest and the drive system is further arranged to displace a drive mass with respect to the rolling member thereby moving the mass centre of the vehicle to achieve a driving force. The main rolling member be of any suitable shape that allows a rolling movement, such as a sphere or a ball, an ellipsoid, a torus or a wheel, combinations thereof or the like.

Upon designing a unitary rolling vehicle, one difficulty is to make it sufficiently robust to sustain all environmental and operating conditions: shocks, stairs, carpets, various obstacles, radiation, thermal fluctuations, or direct manipulation of people or other rolling vehicles, etc. A further difficulty is to design a control system that stabilizes the unitary rolling vehicle when the vehicle is under impact of said conditions.

In the attempts to design a stable unitary rolling vehicle that takes environmental and operating conditions into consideration, a mathematical model of the vehicle has been designed that after time learns to control all possible states of the vehicle, see the prior art document WO 2006/049559. Here a solution is presented that uses a so-called self learning control system based on neural networks.

There are several solutions published how to control a vehicle, described in the following documents: U.S. Pat. Nos. 5,791,425, 6,302,230, EP 1,563,716, U.S. Pat. Nos. 6,289,263, 6,378,634, 6,702,050 and US 2007/0215394. The control systems described are thus designed for simpler system, and are not able to control the complex and complicated situation of controlling a system of a unitary rolling vehicle, especially not when the system is influenced of disturbances.

An important difference between the prior art systems and the system according to the present invention is that the prior art systems are intended to balance an "unbalanced system" and act to maintain the balance, while the system according to the present invention responds to dynamic changes in the movement pattern for the unitary rolling vehicle, where the vehicle constitute a balanced system, and the system compensates for the dynamic changes.

The prior art unitary rolling vehicle can be divided into two major groups:
  Pendulum type comprising a main axis connected diametrically to a rolling member and supporting a drive mechanism arranged to drive a ballast pendulum for rotation around the main axis.
  Shell drive type with a drive mechanism that is supported by and moveable along the rolling member inner surface.

The stabilizing system is aimed at stabilizing all kinds of unitary rolling vehicles, but for illustrative purposes the invention is exemplified with a spherical unitary rolling vehicle of pendulum type.

Due to the displacement of the pendulum centre of mass when driven for rotation about the main axis, the unitary rolling vehicle is put into motion. Moreover, the unitary rolling vehicle may comprise additional equipment in the form of analysis, monitoring, or actuator systems. The rolling member may be of a perfect spherical shape, and/or multi-facetted rolling member formed by a shell with from a minimum of 10 to 30 sides or more. The rolling member can be elongated or shaped in any way as long as one main axis that is suitable for rotation around is preserved. The outer surface of the rolling member can further be provided with a pattern to prevent the unitary rolling vehicle from slipping, sliding sideways or the like.

SUMMARY OF THE INVENTION

The object of the invention is to provide a unitary rolling vehicle, which is able to traverse over an area, both indoors, outdoors, in various terrains, bombed buildings, planetary bodies, etc and compensate for environmental and operating conditions that act on the vehicle. This is achieved by the unitary rolling vehicle with a stabilizing control system as defined by the appended claims.

The unitary rolling vehicle comprising a rolling member, a drive system supported by the rolling member and arranged to drive the rolling member for rotation, the centre of mass of the drive system being lower compared to the centre of the rolling member in the vertical direction at rest, and a control system for controlling the drive system, wherein the control system comprises dynamic state sensors arranged to detect the instant dynamic state of the vehicle and the drive system. This means that sensor data is gathered and the unitary rolling vehicle is controlled in dependence of the detected instant dynamic state of the rolling vehicle.

The control system is further arranged to analyse the detected instant dynamic state over time and to control vehicle motion by feedback of the instant dynamic state. According to a further embodiment, the control system is arranged to compare the analysed instant dynamic state with a desired state and to control the vehicle drive system in dependence of the deviation from the desired state. Thus, the detected instants dynamic state is continuously sensed and analysed, to be able to compare with the desired route (setpoint) for the rolling vehicle, and compensate for deviations from the desired route. The analysis of the instant dynamic state data is made in a stabilizing control system incorporated in the vehicle, or at a remote control terminal.

Another object of the present invention is to provide a unitary rolling vehicle system including at least one sensor, wherein the sensor(s) comprise a gyroscope and/or an accelerometer and/or a rotational sensor for sensing of rotational speed of the motor(s). The sensor(s) are located at suitable places in the vehicle for sensing the dynamic state of the vehicle.

According to one embodiment, the control system comprises at least one analyse module for analysing of sensed data, wherein the analysis is based on multivariate methods. The collected sensed data is thus analysed to give adequate data to the control system.

According to a further embodiment, the control system comprises at least one control module comprising a controller. In a still further embodiment, this controller is a PID-controller. Thus, the unitary rolling vehicle may be controlled in a stable way.

In a further embodiment, the unitary rolling vehicle is adapted to be remotely controlled and the desired state is set by remote control. This embodiment makes it possible to remotely control the vehicle.

In one embodiment, the unitary rolling vehicle is adapted to independently navigate in an essentially unknown environment, only knowing a starting position and an end position, by continuously sensing the dynamic state of the unitary rolling vehicle and controlling the vehicle motion in dependence on the deviation from a desired route. Thus, it is possible for the vehicle to independently navigate in an area in a stable way.

In a further embodiment, the vehicle is adapted to navigate from positioning data retrieved from images taken by a camera system incorporated in the rolling vehicle system. It is thus possible to control the motion of the vehicle in dependence of positioning data retrieved from an image. Combined with an inclinometer, and GPS (other positioning system), the unitary rolling vehicle is able to navigate autonomously over long distances while performing science, surveillance, etc.

In one embodiment, the drive system comprises one or several electric drive motors for rotating a spherical main body about a telescopic/spring relieved axis. The steering system is made in such a way that it provides a possibility of motion in any direction from any single point of rotation. Other possible drive systems for a unitary rolling vehicle are thus possible; the important thing is to continuously gather sensor data to be able to compensate for any deviations from a desired route.

SHORT DESCRIPTION OF THE FIGURES

FIGS. 1a to 1d schematically show examples of shapes of a unitary rolling vehicle according to the present invention.

FIGS. 2a to 2c schematically show an embodiment of a unitary rolling vehicle according to the present invention.

DETAILED DESCRIPTION OF THE INVENTION

The rolling member of the unitary rolling vehicle may be of any suitable shape that allows a rolling movement. FIGS. 1a-1d are showing examples of possible shapes, 1a is showing a sphere, 1b a pumpkin-shape, 1c a wheel-shape and 1d a torus. Other shapes, for example the shape of barrel, are also possible.

In the following illustrated embodiments the rolling member is formed by a shell. This is for illustrative purposes only, and should not be seen as limiting.

One example of a unitary rolling vehicle of the unitary rolling vehicle system according to the present invention comprises one or more of the following features:
an encapsulating shell with a hollow main axis;
a mechanical driving unit situated inside the shell;
a battery power supply system inside or outside the shell;
a wireless communication unit including one or several antennas for transmitting and receiving data to and from one or several base stations.
a computer processing unit for storing, receiving and transmitting data,
a house keeping sensor unit for sensing, collecting and transmitting measurable physical quantities/changes inside the shell.
a sensor system unit for sensing, collecting and transmitting measurable physical quantities/changes on or outside the shell.
an actuator system unit for controlling the mechanical driving device and other actuators such as loudspeakers, video projectors, and other passive and active sensors (ultrasound, laser, sonar, . . . ).
a sensor signal processing unit for signal processing of the sensor data delivered by the sensor systems.
one or several control modules for analyzing collected data and regulate the unitary rolling vehicle based on the analyzed data.

Further, an external battery charging device of the unitary rolling system according to the present invention may comprise one or more of the following features:
a wireless communication unit.
an inductive charging device.
a docking mechanism.

Still further, an external navigation and monitoring base station of the unitary rolling vehicle system according to the present invention may comprise one or more of the following features:
a transmission and receiving unit that communicated with the vehicle apparatus platform (its wireless communication unit).
a display unit that continuously processes and visualizes significant data transmitted from the vehicle apparatus platform.
a navigation unit comprising a conventional joy stick connected to one of several antennas that communicates with the vehicle apparatus platform and its mechanical control system unit.
an action unit that allows a manual operator activate the different actuators onboard the unitary rolling vehicle platform.
one or several analyzing modules for analyzing collected data.
one or several control modules for control of the unitary rolling vehicle based on the analyzed data.

Specific embodiments of the above features will be described below.

Figure 2A:
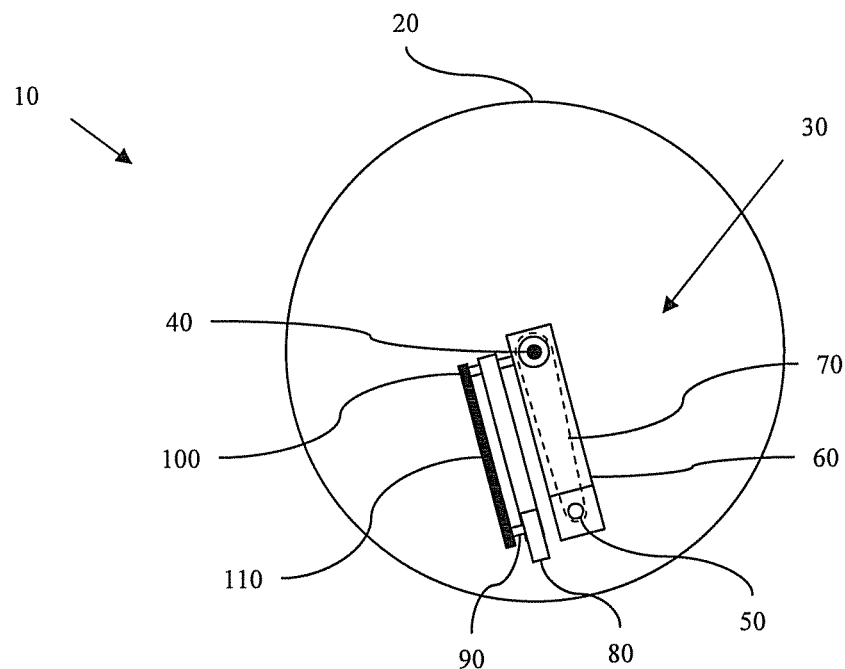
Figure 2B:
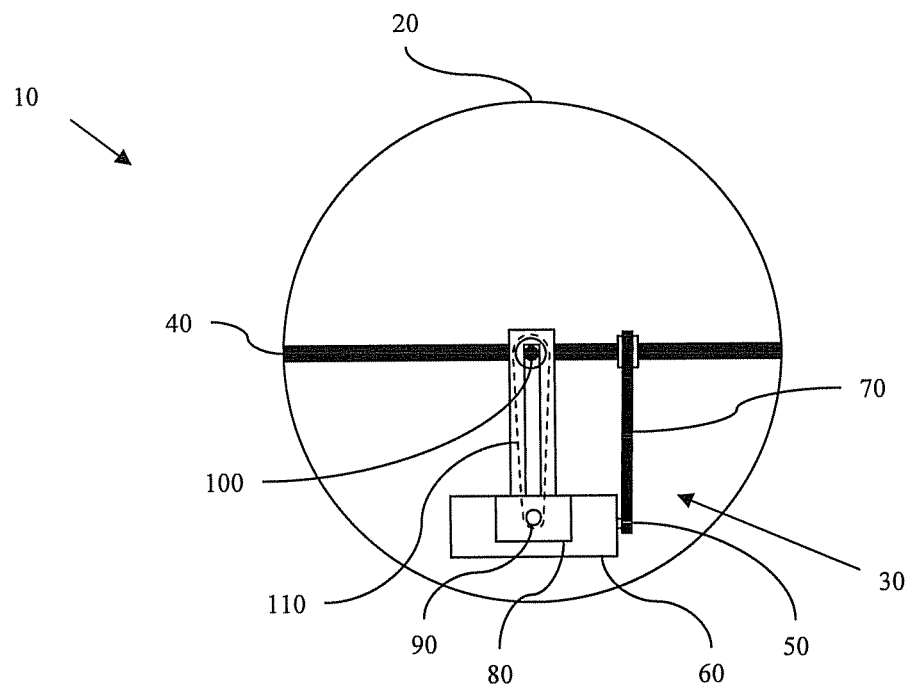

In FIGS. 2a and 2b is shown an example of a unitary rolling vehicle in the form of a ball robot comprising a rolling member of spherical shape and a drive system including two mechanical drive units. The drive system is supported by the rolling member, in this example by a diametric main axis.

The drive mechanism 30 comprises a primary motor 50 driving the drive mechanism 30 for rotation about the diametric main axis 40. As mentioned above, the primary motor 50 is arranged at the lower portion of a primary pendulum 60, in the vicinity of the inner surface of the shell 20 in order to lower the CM. The primary pendulum 60 is rotatably supported by the diametric main axis 20 at the upper end, and the primary motor 50 is arranged to drive the primary pendulum for rotation about the main axis 20 by a primary transmission arrangement 70. The primary motor 50 may be an electric motor and the primary transmission arrangement 70 can be any suitable transmission arrangement, such as a belt, a chain, or an axis arrangement and the like. Further, the transmission arrangement 70 can be a hydraulic transmission arrangement or the like. The primary motor 50 is the main power source for driving the ball robot 10 for rotation in the forward and backwards direction.

The drive mechanism further comprises a secondary pendulum 80 and a secondary motor 90 for driving the secondary pendulum 80 for rotation about a secondary axis 100 transverse to the main axis 40 and attached to the primary pendulum 60. The secondary pendulum 80 is mainly utilized as a steering means, as rotation in either direction will make the robot 10 ball turn in that direction as the CM will move in that direction. The possibilities for the secondary pendulum 80 to influence the movement of the robot ball 10, depends on the weight and the centre of mass for the secondary pendulum 80, hereafter referred to as torque (where high torque for a pendulum is equal to high weight and low CM at rest). Preferably, the secondary pendulum 80 has as high torque as possible, compared to the primary pendulum 60, whereby optimal controllability is achieved. In order to increase the torque of the secondary pendulum 80, the secondary motor 90 is arranged at the lower portion of the secondary pendulum 80, in the vicinity of the inner surface of the shell 20. The secondary motor 90 is arranged to drive the secondary pendulum 80 for rotation about the secondary axis 100 by a secondary transmission arrangement 110. The second transmission arrangement 110 can be of any type as described for the primary transmission arrangement. Preferably, the secondary pendulum 80 is formed such that it can be rotated 360 degrees around the secondary axis 100.

By controlling the primary and secondary motors 50, 90, it is possible to place the centre of mass (CM) at any angle around the vertical line passing through the centre of the robot 10 and the point of contact with the ground.

Figure 2C:
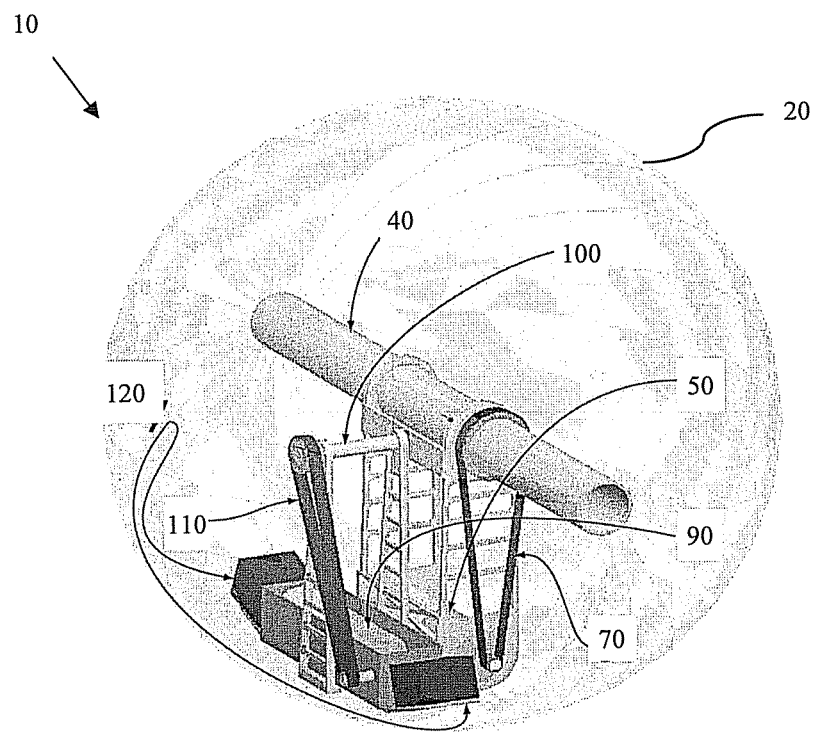

FIG. 2c shows a more detailed example of the embodiment of the unitary rolling vehicle according to the present invention as disclosed in FIGS. 2a and 2b.

There are a plurality of different alternatives for arranging the pendulums and the drive system, and they give the unitary rolling vehicle a great flexibility in its ability to move. Some examples are shown in the prior art document WO 2006/049559, hereby incorporated as reference.

According to one embodiment, the control system for controlling the drive system comprises a control unit that is arranged in or external to the unitary rolling vehicle. In a unitary rolling vehicle of pendulum type as is disclosed in FIGS. 2a to 2c, the control unit and other parts may be arranged close to the vicinity of the inner surface of the vehicle, for example at the lower part of one of the pendulums, in order to increase the torque of the pendulum. In another type of unitary rolling vehicle, the control unit and other parts may be located in order to lower the centre of mass to further stabilize the vehicle.

The control system further comprises dynamic state sensors for detecting the instant dynamic state of the vehicle and the drive system. The dynamic state sensors may include at least a gyroscope, at least an accelerometer and/or at least a rotational sensor for sensing of rotational speed. The sensor(s) are located at appropriate places inside the unitary rolling vehicle, and their respective sensed variables are transmitted to the control unit, either wired or wirelessly. It is also possible to transmit the sensed variables to a remote computer outside the vehicle for further processing.

In one embodiment, the control system includes three gyroscopes, three accelerometers and one rotational sensor for each motor. The gyroscopes are arranged to detect rotation about different axes of rotation and the accelerometers are arranged to detect acceleration/retardation in three different directions. According to one embodiment, the three gyroscopes are arranged to detect rotation about three orthogonal axes of rotation and the accelerometers are arranged to detect acceleration in three orthogonal directions. Hence the control system is capable of detecting any change in dynamic state, such as a sudden change in direction, speed, altitude etc.

In one embodiment, the control system is arranged to analyse the detected instant dynamic state over time and to control vehicle motion by feedback of the instant dynamic state. The analysis may be made in an analyse module in the control unit, or in an analyse module in a control unit at a remote place.

Figure 3:
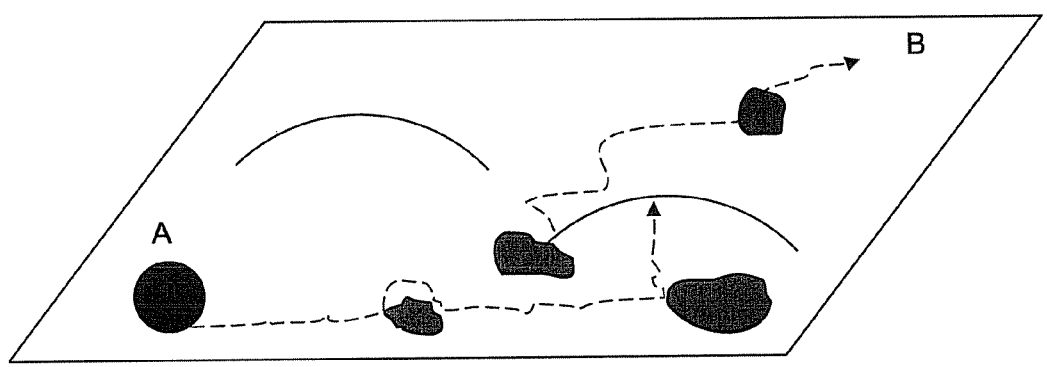
FIG. 3 shows a perspective view of an area to be traversed by a unitary rolling vehicle according to the present invention.

During normal motion, the vehicle is controlled to move autonomously from one point to another or under operator control, in both situations the control system receives parameters that specifies the desired path of movement and speed. However, as is illustrated in FIG. 3 the motion of a unitary vehicle is easily disturbed by the ground conditions and the like, or by other dynamic instable states such as wobbling or the like. Therefore the stabilization system is arranged to detect deviations from the desired path and speed, as well as instability deviations and to compensate for such deviations.

The stable system of the unitary rolling system easily becomes unstable when it is on irregular ground, and the control system has to compensate for theses disturbances in a fast and reliable way. By using the sensed instant dynamic state, the control system may compensate for instabilities and return to a desired state. The control system of the unitary rolling vehicle is further explained below.

Figure 4:
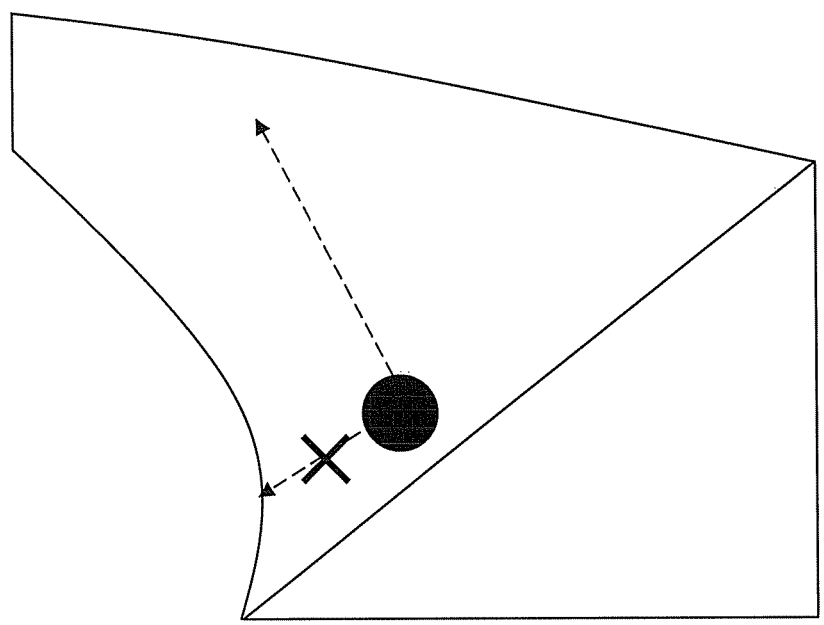
FIG. 4 illustrates a specific complicated situation for a unitary rolling vehicle according to the present invention.

An example of a special difficult situation for the vehicle is shown in FIG. 4. If a unitary rolling vehicle is directed to traverse over a dosed curve, it has a tendency to lose altitude. This is a difficult situation to analyse and control for the control system, and requires an overall fast control system.

In one embodiment, the control system comprises at least one analyse module for analysing of sensed data, wherein the analysis is based on multivariate methods. To be able to control the complex and complicated situation of a unitary rolling vehicle system, a control system has been developed that utilizes multivariate control methods to analyze data in real-time from a plurality of sensors. Based on these data, the drive unit(s) of the drive system is/are controlled in order to obtain desired movement.

In a further embodiment, the control system of the unitary rolling vehicle comprises one control module comprising at least one controller. This gives the possibility to control the movement pattern of the unitary controlled vehicle in accordance with a desired state.

Figure 5:
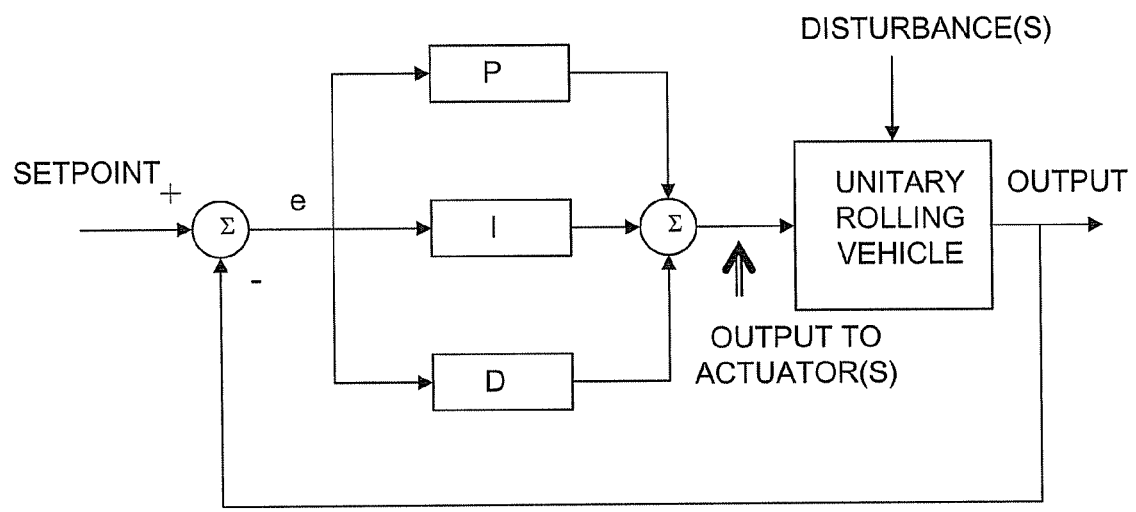
FIG. 5 illustrates an implemented PID-controller for controlling the motion of the unitary rolling vehicle according to the invention.
Figure 6:
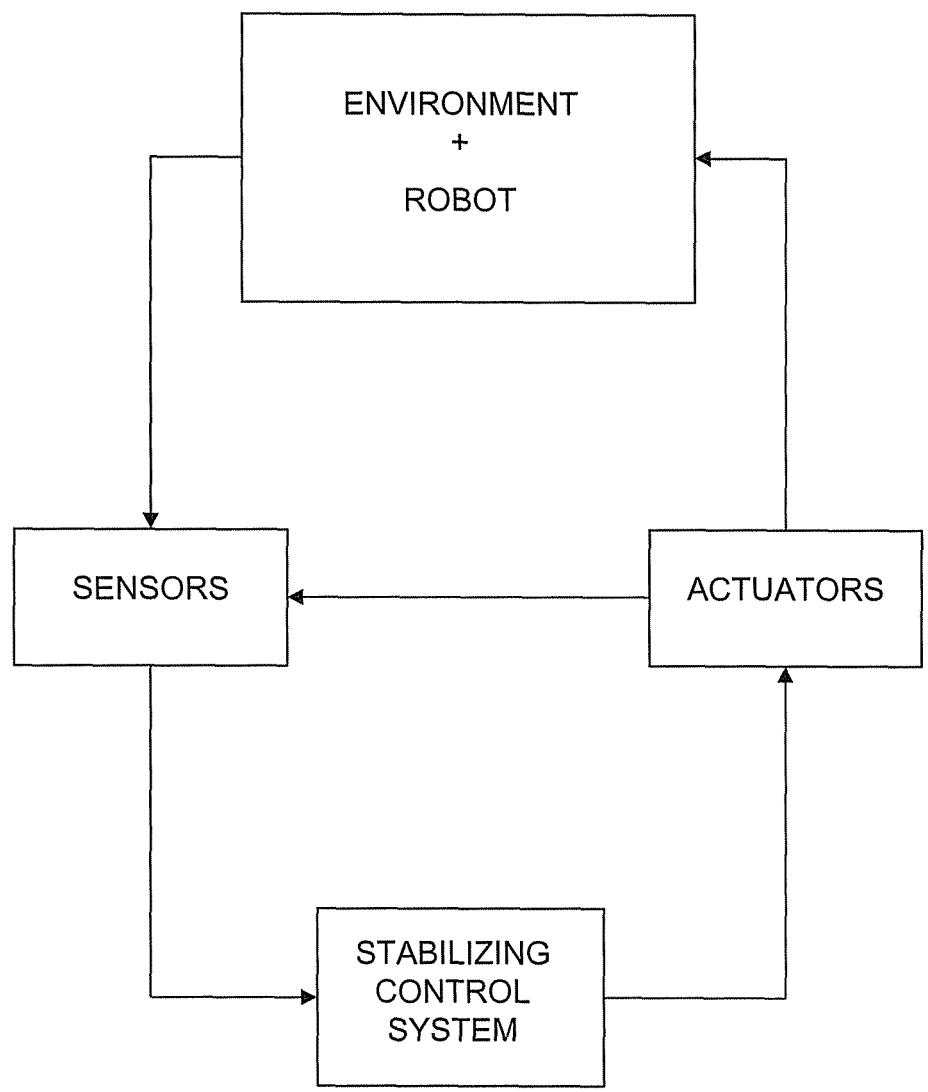
FIG. 6 illustrates a basic configuration of a dynamically controlled unitary rolling vehicle for the unitary controlled rolling vehicle system according to the present invention.

There are a variety of multivariate methods available in the literature, e.g, factor analysis, principal components etc. When appropriate analysis has been made of the collected data, at least one control algorithm is used to control the drive system of the vehicle. Here a PID controller is used as can be seen in FIG. 5. The three constants of the PID controller algorithm are tuned to give desired control action to the drive system. The multivariate method and the controller algorithm are implemented in hardware, and the basic configuration of a control system for a unitary rolling vehicle system is depicted in FIG. 6 where the control system receives inputs via a sensor system and outputs actuator signals that implements physical actions of the vehicle via the mechanical system of the vehicle.

According to one embodiment the system works at a frequency of approximately 300-5000 Hz, which makes a fast enough feedback possible.

Additional input variables are filtered sensor readings from various forms of sensors such as mine sensors, gas sensors, cameras, IR sensors, UV detectors, ultrasound transducers, noise detectors, mass spectrometer etc.

In a further embodiment, the unitary rolling vehicle is adapted to independently navigate in an essentially unknown environment, only knowing a starting position and an end position, by continuously sensing the dynamic state of the unitary rolling vehicle and controlling the vehicle motion in dependence on the deviation from a desired route.

In a further embodiment, the unitary rolling vehicle is adapted to navigate from positioning data retrieved from images taken by a camera system incorporated in the rolling vehicle system.

The control system may consist of one or several subparts/modules organized in a parallel and/or hierarchical manner.
1) Stable realization of robust path following for e.g. surveillance tasks
2) Stable and improved recognition performance for objects and humans.
3) User-friendly access to obstacle avoidance.
4) Robust localization of vehicle based on a combination of GPS sensor readouts and local sensor input features.
5) Concrete possibilities to obtain various degrees of autonomous behaviour that will be perceived as intelligent behaviour by a human observer (like in autonomous search and recognition of objects and humans).

The vehicle may be navigated in a variety of ways. It may be controlled by a joystick controlled by an operator, by reference to an internal map of the environment, by knowing a starting point and an end point etc. It may randomly traverse a certain area.

Figure 7:
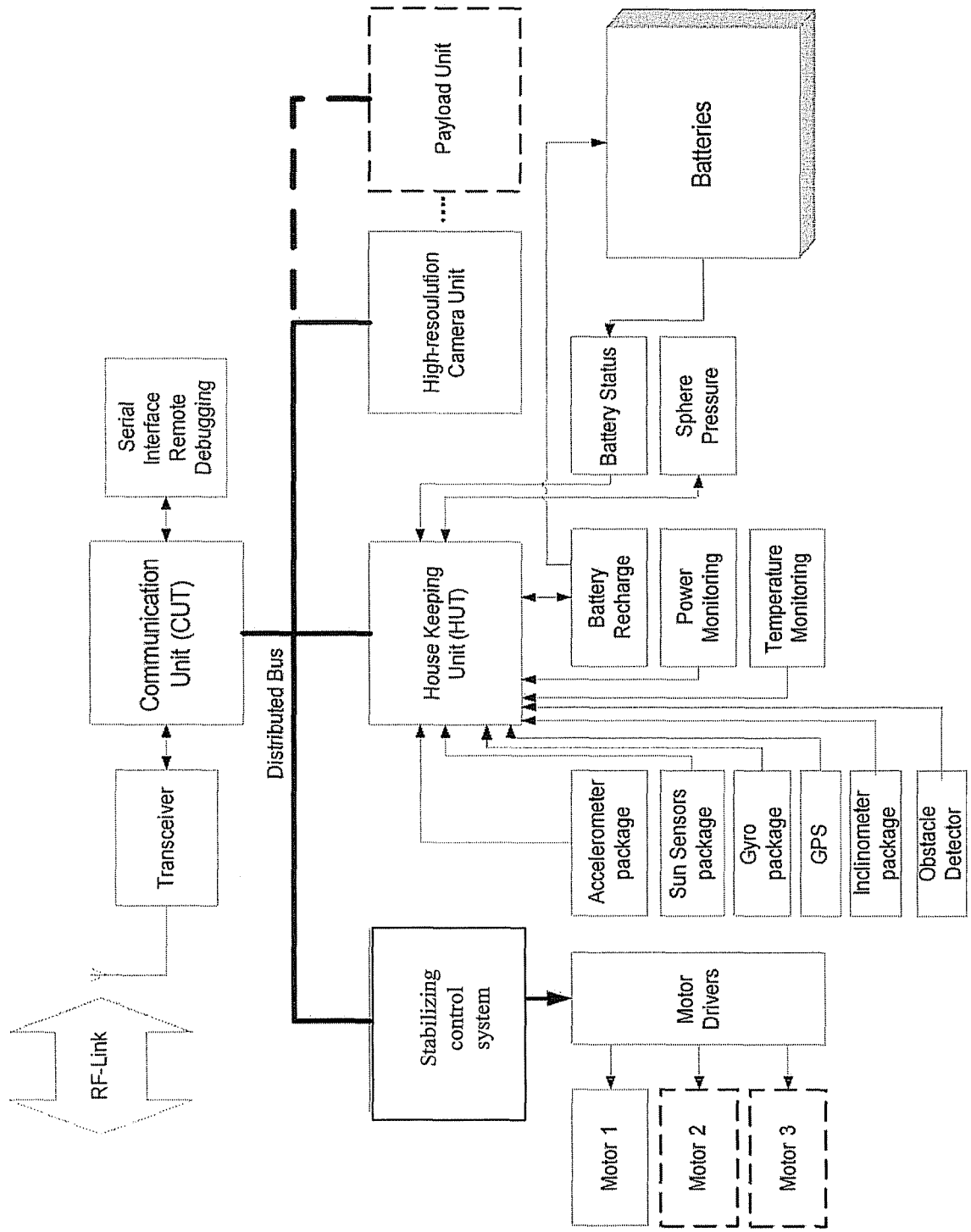
FIG. 7 shows an embodiment of interior electronics of the unitary rolling vehicle according to the present invention.

One embodiment of interior electronics of the unitary rolling vehicle according to the present invention is described in FIG. 7. The unitary rolling vehicle requires communication and guidance capabilities. This may be implemented in at least one micro controller (MCU) or central processing unit (CPU) or field programmable gate array (FPGA) or Digital Signal Processor (DSP) and/or other digital logical device together with motor electronics. The present invention allow the electronics to be implemented in a distributed system, i.e. over several digital logical devices (distributed intelligence) operated over a distributed bus. However this is not required and the same set of functions and/or sensors can be implemented on a single CPU. In FIG. 7 this is illustrated in a set of units, where the communication unit is responsible for communication with other vehicles and/or RTS and/or satellites. The House Keeping Unit collects data from GPS receiver, Sun Sensors, Accelerometers, Gyroscopes, Rotational Sensors, Inclinometers, Obstacle detectors, Power consumption, Temperatures, and any additional equipment with additional data sensing and/or sensor and/or actuator. The House Keeping Unit processes these data and feed the Guidance Unit with guidance inputs. The house keeping unit also control and/or monitors the battery recharge procedure or battery status during operation. The guidance unit controls at least one motor or more according to the guidance data, which can be both autonomously acquired or remotely controlled.

Figure 8:
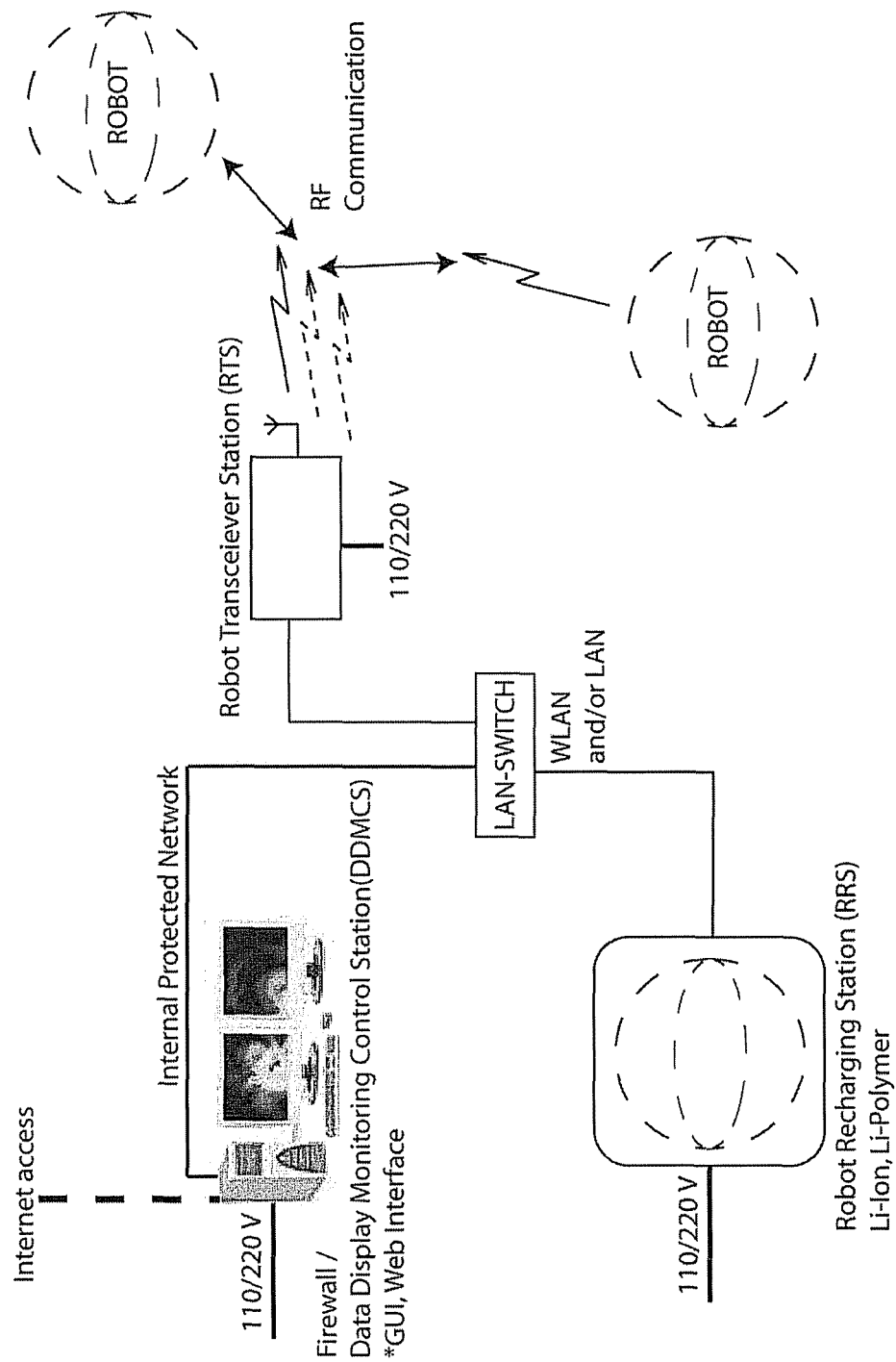
FIG. 8 illustrates one embodiment of a complete unitary rolling vehicle system according to the present invention.

FIG. 8 illustrates one embodiment of a complete unitary rolling vehicle system, with a data/monitoring control station, a recharge station, Robot Transceiver Station, and unitary rolling vehicles (here called robots). The transfer of information between the RTS, data/monitoring station, charging station is made over a secure line using optical transmission, and/or LAN and/or WLAN at available speeds. The data/monitoring station monitors and controls both the charging station and the RTS. Recharging of the vehicles is made autonomously, where two modes are possible; the vehicle determines autonomously that a threshold limit has been reached and returns to the charging station. The second option is that the data/monitoring station either autonomously or on active command tells any or all of the available vehicles to return to the charging station.

The data/monitoring station have a Graphical User Interface (GUI) for control/monitoring of the complete system. An internet connection can be added to the data/monitoring station and in that mode the data/monitoring station can act as a web server for remote service of the unitary rolling vehicle system. The data/monitoring station will have firewall functions to protect the system from intrusion or un-authorized access. Connecting of the internet to the data/monitoring station allows the internal network to utilize the full set of IP-numbers, (that is with IP version 6, 1021 numbers/m2 of the surface of the Earth).

RTS and/or charging stations can be added to the system through the internal LAN/WLAN switch. Additional switches can be added to the internal LAN/WLAN switch to fulfil the connection need of RTS and/or charging stations.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. Unitary rolling vehicle (10) comprising a rolling member, a drive system supported by the rolling member and arranged to drive the rolling member for rotation, the centre of mass of the drive system being lower compared to the centre of the rolling member in the vertical direction at rest, and a control system for controlling the drive system, wherein the control system comprises dynamic state sensors arranged to detect an instant dynamic state of the vehicle and the drive system, wherein the control system is arranged to analyze the detected instant dynamic state over time and to control vehicle motion by feedback of the instant dynamic state, and wherein the control system further is arranged to compare the analyzed instant dynamic state with a desired state and to control the vehicle drive system in dependence of a deviation from the desired state, wherein the desired state is determined based on at least one setpoint specifying a desired route for the unitary rolling vehicle (10).

2. Unitary rolling vehicle according to claim 1, wherein at least one of said sensors comprises a gyroscope.

3. Unitary rolling vehicle according to claim 1, wherein at least one of said sensors comprises an accelerometer.

4. Unitary rolling vehicle according to claim 1, wherein at least one of said sensors comprises a rotational sensor for sensing of rotational speed of at least one motor of said drive system.

5. Unitary rolling vehicle according to claim 1, wherein the control system comprises at least one analysis module to analyze said detected instant dynamic state over time, wherein the analysis is based on multivariate methods.

6. Unitary rolling vehicle according to claim 1, wherein the control system comprises at least one control module comprising a controller.

7. Unitary rolling vehicle according to claim 6, wherein said controller is a PID-controller.

8. Unitary rolling vehicle according to claim 1, wherein the unitary rolling vehicle is adapted to be remotely controlled and that the desired state is set by the remote control.

9. Unitary rolling vehicle according to claim 1, wherein the unitary rolling vehicle is adapted to independently navigate in an essentially unknown environment, only knowing a starting position and an end position, by continuously sensing the dynamic state of the unitary rolling vehicle and controlling the vehicle motion in dependence on the deviation from the desired route.

10. Unitary rolling vehicle according to claim 1, wherein the unitary rolling vehicle is adapted to navigate from positioning data retrieved from images taken by a camera system incorporated in said vehicle.

11. Unitary rolling vehicle according to claim 1, wherein the drive system comprises a drive mechanism (30) comprising a primary motor (50) and a primary pendulum (60), wherein the primary motor is arranged to drive the primary pendulum for rotation about a diametric main axis (20).

12. Unitary rolling vehicle according to claim 11, wherein said drive mechanism (30) comprises a secondary motor (90) arranged to drive a secondary pendulum (80) for rotation about a secondary axis (100).

* * * * *

UNITED STATES PATENT AND TRADEMARK OFFICE
CERTIFICATE OF CORRECTION

PATENT NO. : 8,670,889 B2  
APPLICATION NO. : 12/991735  
DATED : March 11, 2014  
INVENTOR(S) : Viktor Kaznov Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 448 days.

Signed and Sealed this

Twenty-ninth Day of September, 2015

Michelle K. Lee
*Director of the United States Patent and Trademark Office*